July 22, 1969  A. T. BROCK  3,456,645

INHALATION-ACTUATED AEROSOL DISPENSING DEVICE

Filed Jan. 19, 1967  2 Sheets-Sheet 1

INVENTOR
AARON T. BROCK
BY HIS ATTORNEYS
HARRIS, KIECH, RUSSELL & KERN

July 22, 1969  A. T. BROCK  3,456,645
INHALATION-ACTUATED AEROSOL DISPENSING DEVICE
Filed Jan. 19, 1967  2 Sheets-Sheet 2

INVENTOR
AARON T. BROCK
BY HIS ATTORNEYS
HARRIS, KIECH, RUSSELL & KERN

United States Patent Office 3,456,645
Patented July 22, 1969

3,456,645
INHALATION-ACTUATED AEROSOL
DISPENSING DEVICE
Aaron T. Brock, Northridge, Calif., assignor to Dart Industries Inc., Los Angeles, Calif., a corporation of Delaware
Filed Jan. 19, 1967, Ser. No. 610,341
Int. Cl. A61m 11/00, 15/06, 15/00
U.S. Cl. 128—173                                         10 Claims

ABSTRACT OF THE DISCLOSURE

An aerosol dispensing device for discharging a metered amount of a medicament-containing aerosol into the mouth of a patent during inhalation. A lever and cam arrangement for placing the device in the charging condition and a breath-actuated vane for tripping the latched mechanism and dispensing a charge, with the lever comprising the mouthpiece.

---

Figure 1:
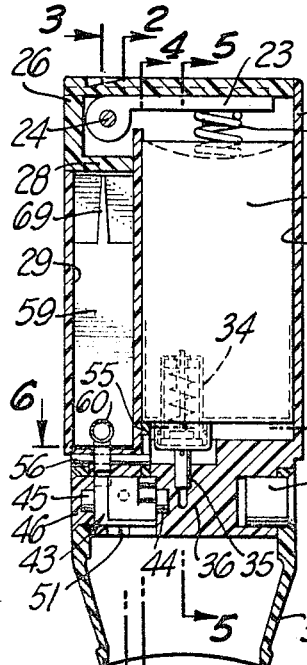

This invention relates to a dispensing device which is particularly suited for dispensing and administering measured amounts of fluids. The principal use for devices of this type at the present time is in dispensing metered amounts of a medicament-containing aerosol for inhalation therapy.

In dispensing devices of this type, the apparatus may be manually actuated to a cocked or charging position during which a measured quantity of the material to be dispensed may be metered into a metering chamber. The outlet or mouthpiece of the device is then placed in the patient's mouth and the initiation of inhalation triggers the mechanism, dispensing the metered amount of material directly into the mouth. It is an object of the present invention to provide a new and improved operating mechanism for dispensing devices of this general type. A further object is to provide such a device which is compact, simple and inexpensive. An additional object is to provide such a device which is sensitive and substantially foolproof in operation and which requires little of the patient in the way of manipulative ability or strength or coordination.

It is an object of the present invention to provide such a dispensing device suitable for use with replaceable aerosol containers and one in which the user can readily remove a used container and install a fresh container.

It is an object of the invention to provide in a dispensing device incorporating an aerosol dispensing container and a metering valve, the improvement comprising a cam rotatably mounted in the housing with movement of the cam in a first direction moving the valve means to the charging position and moving a spring to a cocked position, with the spring urging the cam in a second opposite direction, a lever carried in the housing and engageable with the cam for moving the cam in the first direction, and actuating means mounted in the housing and movable between first and second positions and including a cam engaging element engageable with the cam when in the first position to prevent movement of the cam in the second direction. A further object is to provide such a device wherein a pressure differential in the air passage across the actuating means, as produced by inhalation, moves the actuating means to the second position permitting movement of the cam in the second direction and movement of the valve to the discharging position. It is a particular object of the invention to provide such a dispensing device wherein the cocking or charging lever comprises the mouthpiece which is pivotally mounted on the main housing and also forms a portion of the air passage through the device.

The invention also comprises novel details of construction and novel combinations and arrangements of parts, which will more fully appear in the course of the following description. The drawings merely show and the description merely describes preferred embodiments of the present invention which are given by way of illustration or example.

Figure 10:
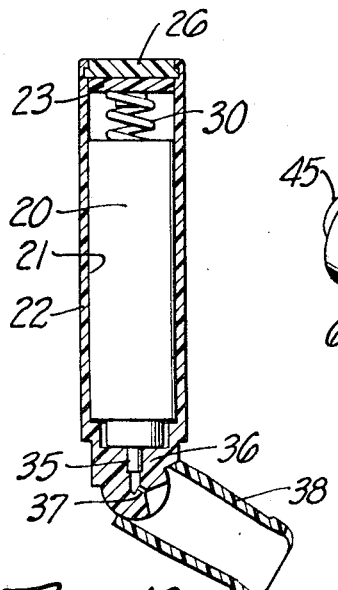
Figure 11:
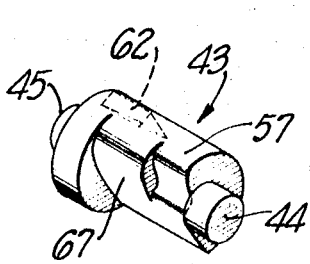
Figure 6:
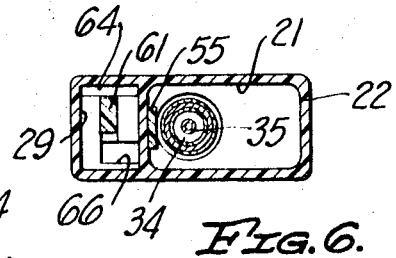
Figure 12:
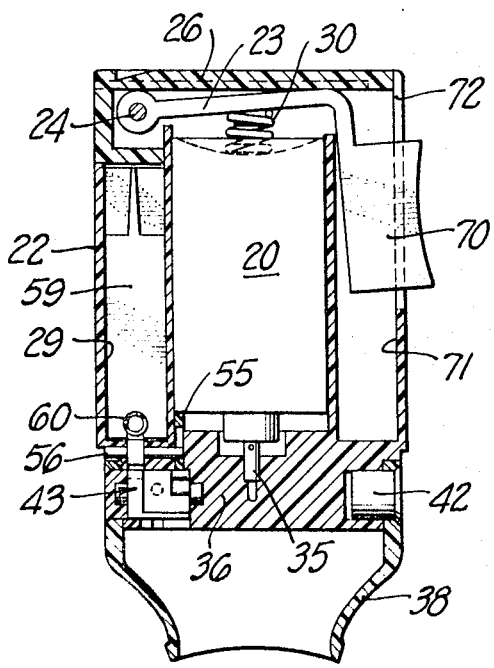
Figure 13:
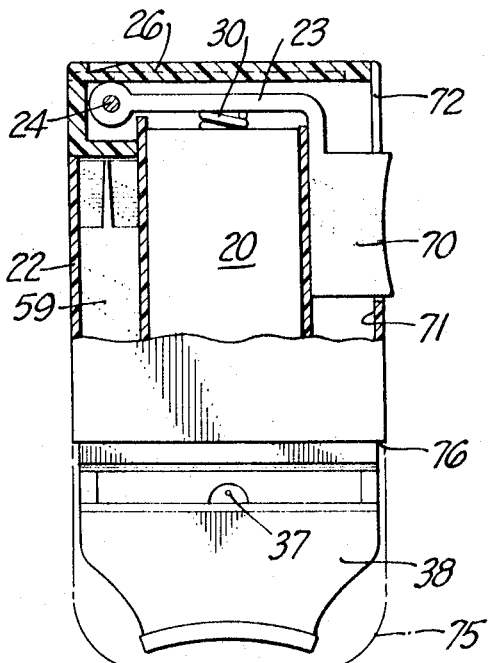

In the drawings:
FIG. 1 is a sectional view of a preferred embodiment of the dispensing device showing the device in the charging position;
FIGS. 2, 3, 4 and 5 are sectional views taken along the lines 2—2, 3—3, 4—4 and 5—5, respectively, of FIG. 1;
FIG. 6 is a sectional view taken along the line 6—6 of FIG. 1;
FIGS. 7, 8, 9 and 10 are sectional views corresponding to FIGS. 2, 3, 4 and 5, respectively, showing the device in the discharging position;
FIG. 11 is an enlarged perspective view of the cam of the device of FIG. 1;
FIG. 12 is a sectional view similar to that of FIG. 1 showing an alternative embodiment of the device of the invention; and
FIG. 13 is a partial sectional view of the device of FIG. 12 showing the second lever in the operative position.

Figure 2:
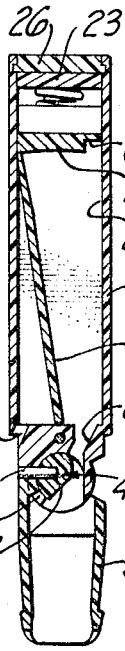
Figure 3:
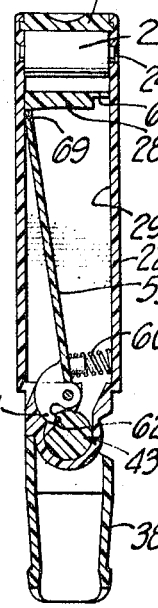

Referring to the device of FIGS. 1–11, a container 20 is positioned in a compartment 21 of a housing 22. A lever 23 is pivotally mounted on a pin 24 at the upper end of the compartment 21. The upper end of the housing is closed by a J-shaped member 26 laterally slidable in grooves 27 of the housing 22. The portion 28 of the member 26 closes the upper end of another compartment 29 of the housing (FIGS. 1–3). A spring 30 is carried on a boss 31 of the lever 23.

With the J-shaped member 26 removed and the lever 23 pivoted to a vertical position, the container 20 may be slidably inserted into or removed from the housing 22. With the container in the compartment 21, the lever 23 is pivoted to the horizontal position of FIG. 1 and is manually held down compressing the spring 30. The member 26 is then slid into position as shown in FIG. 1, holding the lever 23 in the horizontal position.

Figures 4, 5:
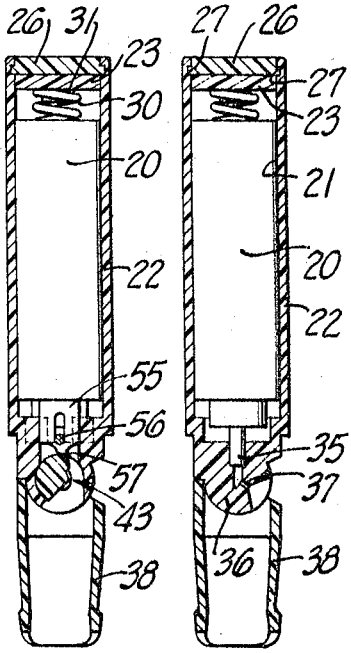

The container 20 may be a conventional aerosol dispensing container and a typical container is described in U.S. Patent No. 3,001,524. A metering valve 34 may be incorporated in the container 20 and includes a stem with a tubular outer end 35. The valve construction is conventional and reference may be made to the aforesaid patent for details of construction and operation. The tubular end 35 of the valve enters a support member 36 formed at the lower end of the housing 22. A discharge passage 37 is provided in the member 36 for communication between the valve and the interior of a mouthpiece 38 (FIGS. 5 and 10). The container is preferably but not necessarily removable and replaceable.

With the valve and container in the charging position of FIGS. 1–5, a measured amount of the fluid in the container is introduced into a metering chamber of the valve. When the valve and container are moved to the discharging position of FIGS. 7–10, this measured amount of fluid is dispensed from the valve through the tubular end 35 into the mouthpiece 38.

The mouthpiece 38 is mounted on the housing 22 with a pin 42 and a cam 43 for pivoting between the position of FIGS. 1–5 and the position of FIGS. 7–10. The pin 42 is fixed to the mouthpiece 38 and pivots in the lower portion of the housing 22. The cam 43 rotates on shaft portions 44, 45 (FIG. 11), with the shaft portion 44 pivoting in the lower portion of the housing 22 and with the shaft portion 45 pivoting in a plug 46 fixed to the mouthpiece 38.

A pin 50 projects radially outward from the cam 43 (FIGS. 2 and 7) and rides in a slot 51 formed in the lower portion of the housing 22. A boss 52 of the mouthpiece 38 rides in the slot 51 below the pin 50.

A slide member 55 is positioned in a groove 57 in the lower portion of the housing 22 for vertical sliding motion relative to the housing (FIGS. 1 and 4). A pin 56 is positioned in the housing and passes through a vertically disposed slot in the slide member 55 serving as an additional guide for the slide member. The upper end of the slide member 55 engages the container 20 and the lower end has a rounded projection which rides on a surface 57 of the cam 43 (FIG. 4).

Figure 8:
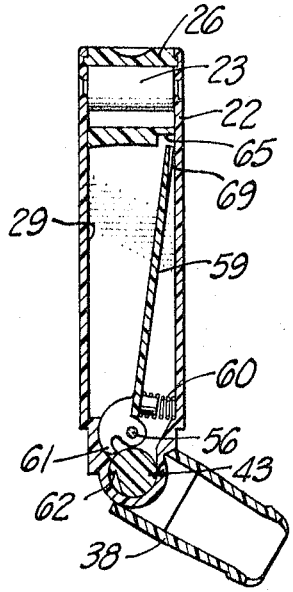
Figure 9:
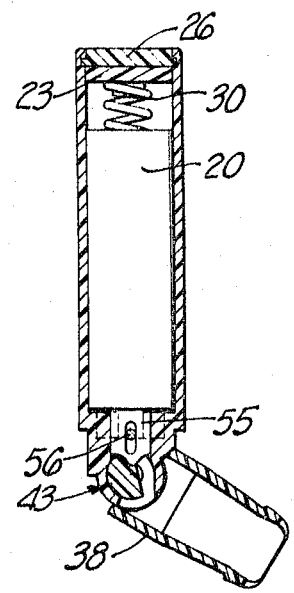

A pressure-operated actuating element is provided for controlling the dispensing operation. Typically this may comprise a vane member in the form of a flapper 59 which is pivotally mounted in the compartment 29 of the housing on the pin 56 (FIGS. 1, 3 and 8). A small spring 60 is positioned between the flapper 59 and a wall of the compartment 22 for urging the flapper 59 counterclockwise as viewed in the drawings, to the position of FIG. 3. A boss 58 may be formed on the flapper 59 for receiving one end of the spring 60. A hook member 61 is formed on the flapper for engaging a notch 62 of the cam 43.

Figure 7:
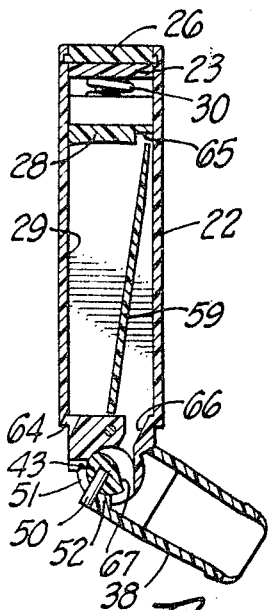

An air passage is provided through the device and includes an inlet 64 to the compartment 29, a recess 65 in the portion 28 of the member 26, an outlet 66 from the compartment 29, a relieved portion 67 on the cam 43, and the mouthpiece 38 (FIG. 7). The flapper 59 is shaped so that in the position of FIGS. 2 and 3, the flapper substantially closes the air passage. When the flapper is in the position of FIGS. 7 and 8, air flow may occur over the end of the flapper via the recess 65. Means may be provided for spacing the upper end of the flapper from the wall of the compartment when in the position of FIGS. 7 and 8. Typically this means may comprise a rib 69 on the flapper, with this rib engaging the wall of the compartment and spacing the remainder of the flapper from the wall.

The operation of the device may be followed by assuming that a metered dose has just been dispensed and the mechanism is in the position of FIGS. 7-10. The mouthpiece 38 is manually rotated from the angled position to the aligned position of FIGS. 1-5. The mouthpiece functions as a lever and engages the pin 50, rotating the cam from the position of FIG. 7 to the position of FIG. 2. This cam rotation moves the sliding member 55 upward from the position of FIG. 9 to the position of FIG. 4, thereby moving the container 20 upward, compressing the spring 30 and placing the valve and container in the charging condition. After the cam is rotated from the position of FIG. 8 to the position of FIG. 3, the flapper 59 may be moved to the position of FIG. 3 with the hook 61 engaging the notch 62. The spring 30 is now compressed or cocked and the mechanism is latched in the charging position.

When the patient wishes to administer another dose, the mouthpiece is moved to the angled position and is placed in the patient's mouth. This movement of the mouthpiece moves the boss 52 downward in the slot 51, providing space for subsequent movement of the pin 50, but the cam remains latched in place. When the patient starts to inhale through the mouthpiece, a pressure differential is created across the flapper 59 causing clockwise rotation of the flapper. This flapper movement removes the hook 61 from the notch 62 of the cam and the cam is rotated by the force applied by the spring 30 through the container 20 and the slide member 55, to the position of FIG. 9. The downward motion of the container moves the valve to the discharging position and a metered dose is dispensed through the tubular end 35 and the passage 37 into the mouthpiece 38 for mixing with the air being inhaled by the patient through the air passage of the device.

An alternative form of the dispensing device is illustrated in FIGS. 12 and 13, wherein components corresponding to those of the embodiment of FIGS. 1–11 are identified by the same reference numerals. An extension 70 of the lever 23 is disposed in a compartment 71 of the housing, with a portion of the extension 70 projecting out of the housing through an opening 72. The lever 23 is pivotal between the position of FIG. 12 and the position of FIG. 13 and is intended to be manually moved to the position of FIG. 13 compressing the spring 30. When the device is in the condition of FIG. 12, the spring 30 is relaxed or substantially relaxed so that it will not produce a discharge when the flapper 59 is moved by inhalation. When the lever 70 is in the position of FIG. 13, the spring 30 is in the compressed or cocked condition and the device is ready for operation in the same manner as the earlier described embodiment.

If desired, a cover may be provided for the mouthpiece and air passage inlet for protecting the mechanism when not in use. A typical cover 75 is shown in phantom lines on FIG. 13 and may be slidably positioned over the mouthpiece in abutting relation with a shoulder 76 of the housing providing a smooth exterior for the device. A similar housing may be used with the device of FIG. 1 if desired. The cover also maintains the device in the aligned position where operation is impossible. This prevents inadvertent discharge during storage or when carried by user.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. A dispensing device for use in combination with an aerosol dispensing container equipped with a metering valve means movable between charging and discharging positions and having a discharge tube at one end thereof and charged with a self-propelling liquid composition, the device including:
    a housing for receiving said container for reciprocation of said container within said housing, said housing including means defining an air passage therethrough,
    said housing including a support member having an opening for receiving said discharge tube and providing a discharge passage for said tube into said air passage;
    spring means carried in said housing engageable with said container for urging said container toward said support member and said valve means toward said discharging position, with said spring means being compressible to a cocked position permitting movement of said valve means to said charging position and movement of said container away from said support member;
    latch means for latching said spring means in said cocked position; and
    trigger means for tripping said latch means to release said spring means to move said valve means to said discharging position;
    wherein the improvement comprises:
    a cam rotatably mounted in said housing and including means engageable with said container, with movement of said cam in a first direction moving said valve means to said charging position and said container away from said support member, and with said spring means urging said cam in a second opposite direction;
    lever means carried in said housing and engageable with said cam for moving said cam in said first direction; and actuating means positioned in said air passage and movable between first and second positions and including a cam-engaging element engageable with said cam when in said first position to prevent movement of said cam in said second direction, with a pressure differential in said air passage across said actuating means moving said actuating means to said second position, permitting movement of said cam in said second direction and movement of said valve means to the discharging position, said actuating means and cam-engaging element comprising said trigger and latch means.

2. A device as defined in claim 1 in which said cam comprises a cylindrically formed member disposed in said air passage and includes a relieved portion for maintaining said passage open.

3. A device as defined in claim 1 in which said lever means comprises a mouthpiece pivotally mounted on said housing and forming a portion of said air passage.

4. A device as defined in claim 1 in which said spring means is positioned between said housing and said container for continuously urging said container toward said support member and said valve means toward said discharging position.

5. A device as defined in claim 1 including a second lever mounted in said housing and manually movable from an inoperative position to an operative position, and in which said spring means is positioned between said second lever and said container for urging said container toward said support member and said valve means toward said discharging position when said second lever is in said operative position.

6. A device as defined in claim 1 in which said actuating means comprises a vane mounted in said housing and movable from said first position substantially blocking said air passage to said second position not blocking said air passage, said vane including said cam-engaging element engageable with said cam when in said first position to prevent movement of said cam in said second direction.

7. A device as defined in claim 6 in which said cam comprises a cylindrically formed member disposed in said air passage and includes a relieved portion for maintaining said air passage open, and said lever means comprises a mouthpiece mounted on said housing for pivoting between charging and discharging positions and forming a portion of said air passage, with said discharge passage opening into said mouthpiece, and with said mouthpiece engaging said cam when in the mouthpiece charging position and leaving said cam free for movement when in the mouthpiece discharging position.

8. A device as defined in claim 7 in which said air passage includes a compartment having adjacent inlet and outlet with said vane mounted therebetween for movement in said compartment between said first and second positions, and with said outlet communicating with said mouthpiece via said cam portion;

said device including second spring means urging said vane to said first position;

said compartment including a recessed section located adjacent the free end of said vane when in said second position permitting air flow around said free end, said vane and housing including interengaging means for spacing said vane from said housing when said vane is in said second position.

9. In a dispensing device, the combination of:

a housing including an aersol dispensing container charged with a self-propelling liquid composition, said housing including means defining an air passage therethrough;

metering valve means coupled to said container and movable between a charging position for receiving a charge from said container and a discharging position for dispensing said charge;

spring means carried in said housing for urging said valve means toward said discharging position, with said spring means being compressible to a cocked position permitting movement of said valve means to said charging position;

a cam rotatably mounted in said housing with movement of said cam in a first direction moving said valve means to said charging position and said spring means to said cocked position, with said spring means urging said cam in a second opposite direction;

lever means carried in said housing and engageable with said cam for moving said cam in said first direction; and actuating means positioned in said air passage and movable between first and second positions and including a cam-engaging element engageable with said cam when in said first position to prevent movement of said cam in said second direction, with a pressure differential in said air passage across said actuating means moving said actuating means to said second position, permitting movement of said cam in said second direction and movement of said valve means to the discharging position.

10. A device as defined in claim 9 in which said lever means comprises a mouthpiece pivotally mounted on said housing and forming a portion of said air passage, with said valve means dispensing said charge into said mouthpiece.

References Cited

UNITED STATES PATENTS

| | | | |
|---|---|---|---|
| 2,992,645 | 7/1961 | Fowler | 128—266 X |
| 3,001,524 | 9/1961 | Maison et al. | 128—208 X |
| 3,187,748 | 6/1965 | Mitchell et al. | 128—173 |

RICHARD A. GAUDET, Primary Examiner

MARTIN F. MAJESTIC, Assistant Examiner

U.S. Cl. X.R.

128—208, 211